United States Patent [19]

Kuroda

[11] Patent Number: 5,220,449
[45] Date of Patent: * Jun. 15, 1993

[54] LIGHT BEAM SCANNING OPTICAL SYSTEM

[75] Inventor: Muneo Kuroda, Osaka, Japan

[73] Assignee: Minolta Camera Kabushiki Kaisha, Osaka, Japan

[*] Notice: The portion of the term of this patent subsequent to Jan. 15, 2008 has been disclaimed.

[21] Appl. No.: 561,777

[22] Filed: Aug. 1, 1990

[30] Foreign Application Priority Data

Aug. 2, 1989 [JP] Japan .................. 1-201546

[51] Int. Cl.5 ........................................... G02B 26/08
[52] U.S. Cl. .................................... 359/196; 359/208; 359/217
[58] Field of Search ................... 350/6.1–6.91, 350/6.5, 6.7, 6.8; 250/234–236; 346/76 L, 108, 110; 359/196–226

[56] References Cited

U.S. PATENT DOCUMENTS

| | | | |
|---|---|---|---|
| 3,469,030 | 9/1969 | Priebe | 358/206 |
| 3,750,189 | 7/1973 | Fleischer | 346/160 |
| 3,946,150 | 3/1976 | Grafton | 358/481 |
| 4,196,961 | 4/1980 | Walter et al. | 359/208 |
| 4,230,394 | 10/1980 | Brueggemann et al. | 359/208 |
| 4,512,625 | 4/1985 | Brueggemann | 350/6.7 |
| 4,520,370 | 5/1985 | Fujii et al. | 346/76 L |
| 4,690,485 | 9/1987 | Plaot | 350/6.5 |
| 4,704,698 | 11/1987 | Reiniger | 364/523 |
| 4,720,632 | 1/1988 | Kaneko | 350/6.8 |
| 4,759,593 | 7/1988 | Kessler | 350/6.8 |
| 4,796,962 | 1/1989 | Dejager et al. | 350/6.8 |
| 4,847,492 | 7/1989 | Houki | 350/235 |
| 4,847,644 | 7/1989 | Oda et al. | 350/6.8 |
| 4,848,864 | 7/1989 | Ostertag et al. | 350/6.8 |
| 4,941,719 | 7/1990 | Hisada et al. | 350/6.8 |
| 4,984,858 | 1/1991 | Kuroda | 350/6.8 |
| 4,997,242 | 3/1991 | Amos | 250/234 |
| 5,013,108 | 5/1991 | Van Amstel | 350/6.8 |
| 5,093,745 | 3/1992 | Kunoda | 359/217 |

FOREIGN PATENT DOCUMENTS

| | | | |
|---|---|---|---|
| WO82/03924 | 11/1982 | European Pat. Off. | |
| 54-12304 | 9/1979 | Japan | |
| 55-36127 | 9/1980 | Japan | |
| 61-173212 | 8/1986 | Japan | |
| 300218 | 12/1989 | Japan | 359/218 |
| 131212 | 5/1990 | Japan | 359/217 |

Primary Examiner—Bruce Y. Arnold
Assistant Examiner—Thong Nguyen
Attorney, Agent, or Firm—Price, Gess & Ubell

[57] ABSTRACT

A toroidal lens and two pieces of spherical mirrors cooperatively function to have a uniform velocity of a light beam over a range from the center to both edges of a scanning area when the light beam deflected at an equiangular velocity by a rotative deflection device is directed toward a light collecting surface. The toroidal lens further maintains a conjugate relation of each reflective surface of the rotative deflection device and the light collecting surface by which an error in the inclination of image on each reflective surface is rectified, and at the same time, the direction of radiation of the light beam is regulated so as to make the curvature of the field smaller.

12 Claims, 5 Drawing Sheets

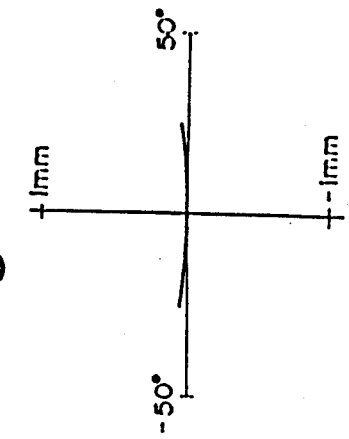 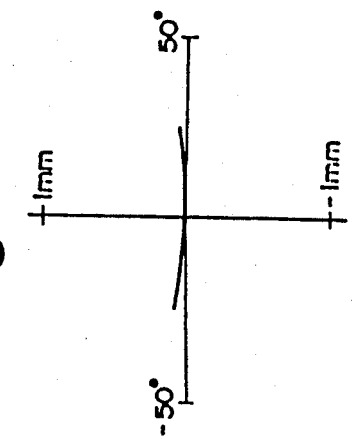
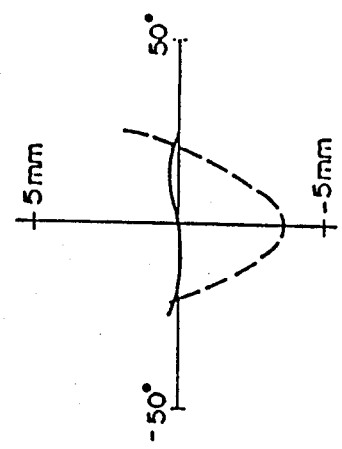 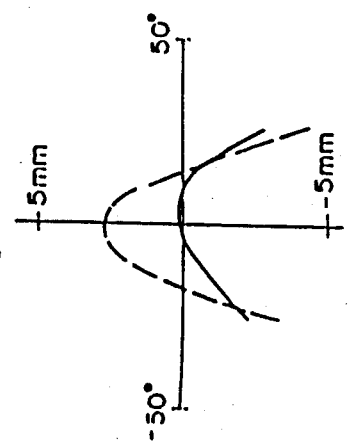
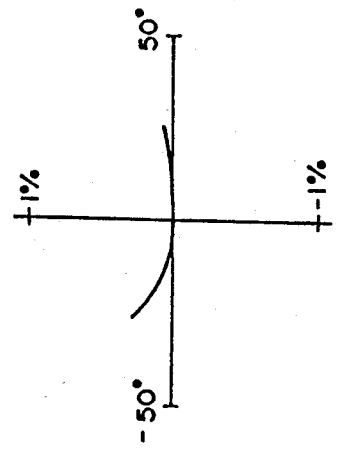 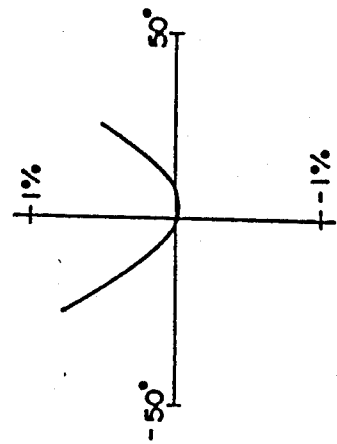

LIGHT BEAM SCANNING OPTICAL SYSTEM

BACKGROUND OF THE INVENTION

1. Technical Field of the Invention

The present invention relates to a light beam scanning optical system, and more particularly to a structure of a light beam scanning optical system incorporated in laser beam printers, facsimiles and the like for scanning a beam receiving surface with a light beam.

2. Brief Description of Related Art

Generally, a light beam scanning optical system utilized in laser beam printers and facsimiles basically comprises a semiconductor laser as a light source, a deflecting means such as a polygon mirror and an fθ lens. The scanning means is utilized for scanning a luminous flux emitted from the semiconductor laser at an equiangular velocity, whereby a spot of the luminous flux moves on a light receiving surface in a main scanning direction. With the equiangular velocity, a difference in a scanning speed occurs over a range from central portion to both edges in the main scanning direction because the light receiving surface is flat. An fθ lens is therefore provided for rectifying the difference in the scanning speed.

Since the fθ lens must be made by combining various concave lenses and convex lenses, lens planning is extremely complicated. Because of a number of lens surfaces to be ground, manufacturing process of the fθ lens requires higher accuracy and higher cost. Moreover, the fθ lens has a problem that various lenses of the fθ lens must be made of a limited material which possesses good permeability. In order to solve the problems, in place of the fθ lens, the use of an elliptical mirror (Japanese Published Unexamined Patent Application No. 123040/1979), the use of parabolic mirror (Japanese Published Examined Patent Application No. 36127/1980) and the use of a concave reflector (Japanese Published Unexamined Patent Application No. 173212/1986) have heretofore been proposed. However, there still leaves difficulties in manufacturing the elliptical mirror and parabolic mirror with further difficulty in obtaining high manufacturing accuracy.

SUMMARY OF THE INVENTION

The main object of the present invention is to provide an inexpensive and compact light beam scanning optical system by skillfully adopting a scanning speed rectifying means which can be readily manufactured and capable of improving manufacturing accuracy in place of the expensive and limited availability of fθ lens, parabolic mirror and the like.

Another object of the present invention is to provide a light beam scanning optical system capable of rectifying a deviation of a scanning line, in a sub-scanning direction perpendicular to the main scanning direction, caused by inclination of a rotational axis of a polygon mirror, in addition to reduce curvature of the field by a luminous flux in a section perpendicular to the main scanning direction.

These and other objects and features of the present invention will become more apparent from the following description taken in conjunction with the accompanying drawings which illustrate specific embodiment of the invention.

BRIEF DESCRIPTION OF THE DRAWINGS

FIGS. 4 through 7 are graphs showing aberrations on each of the light collecting surface.

The respective FIGS. (4a), 5(a), and 7(a) disclose the relative degree of distortion versus the scanning angle, while FIGS. 4(b), 5(b), 6(b), and 7(b) disclose the degree of curvature versus the scanning angle. FIGS. 4(c), 5(c), 6(c), and 7(c) disclose the degree of distortion of the scanning line over the scanning angle.

It is to be noted that like members and portions are designated by like numerals, and repeated descriptions are omitted.

DESCRIPTION OF THE PREFERRED EMBODIMENT

Description will now be made on an embodiment of the present invention referring to the accompanying drawings.

Figure 1:
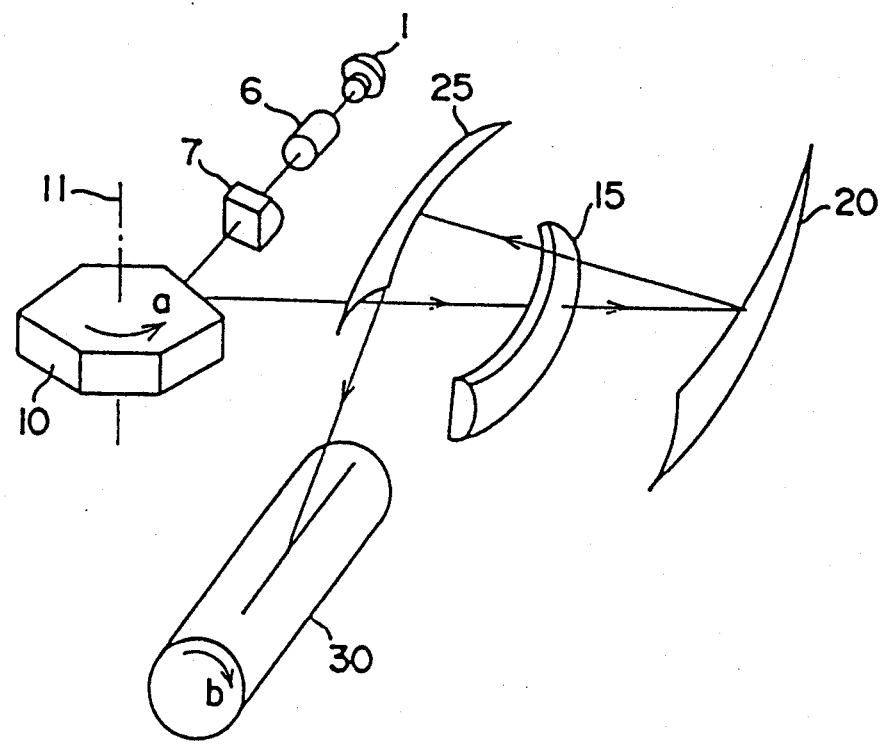
FIG. 1 is a perspective view showing the schematic structure of an embodiment of a light beam scanning optical system to which the present invention is applied.

FIG. 1 shows a schematic construction of a light beam scanning optical system to which the present invention is applied. A semiconductor laser designated by reference numeral 1 in the figure is intensely modulated by an unillustrated control circuit and radiates an emitting luminous flux provided with image information. The emitted luminous flux is rectified to a convergent luminous flux by passing through a collimator lens 6. The converged luminous flux further converges in the main scanning direction by passing through a cylindrical lens 7. Practically, it linearly converges in the vicinity of a reflective surface of a polygon mirror 10.

The polygon mirror 10 is rotatively driven by an unillustrated motor in the direction of arrow a at a constant speed centering on a shaft 11. The convergent luminous flux emitted from the cylindrical lens 7 is successively reflected by the facet of the polygon mirror 10 and deflected at an equiangular velocity. The deflected luminous flux passes through a toroidal lens 15 and is then reflected by a first spherical mirror 20 and a second spherical mirror 25 to be collected onto the surface of a photoconductor 30. The spot of the collected luminous flux moves at a uniform velocity in the axial direction of the photoconductor 30 according to the rotation of the polygon mirror 10. This scanning is called main scanning. The photoconductor 30 is rotatively driven at a constant speed in the direction of arrow b, and the scanning by this rotation of the photoconductor 30 is called sub-scanning.

In such a light beam scanning optical system, an image (an electrostatic latent image) is formed on the surface of the photoconductor 30 by intense modulation of the luminous flux with said main scanning and sub-scanning. As illustrated in the FIG. 2, in place of the conventional fθ lens, (not shown) the toroidal lens 15, first spherical mirror 20 and second spherical mirror 25 rectify the scanning speed in the main scanning direction to be uniform over the range from the center to both edges of the scanning area. The toroidal lens 15 is arranged to rectify an inclination of the rotational axis of the polygon mirror 10, and at the same time, lessens the curvature of the field. In other words, an image plane produced by the luminous flux in a section perpendicular to the main scanning direction is leveled.

If there occurs a tilt error on each reflective facet of the polygon mirror 10, a scanning line on the photoconductor 30 deviates in the sub-scanning direction and an irregular pitch is produced on an image. The tilt error can be rectified by setting each reflective facet of the polygon mirror 10 and the light collecting surface of the photoconductor 30 in a conjugate relation in the section perpendicular to the main scanning direction. In this embodiment, a luminous flux is collected onto the polygon mirror 10 by the cylindrical lens 7, and each reflective facet and light collecting surface are arranged to maintain the conjugate relation by the toroidal lens 15, the first spherical mirror 20 and the second spherical mirror 25.

According to this embodiment, it is further arranged to rectify an emitting luminous flux to a convergent luminous flux by the collimator lens 6 so that the curvature of the field in the vicinity of the photoconductor 30 can be rectified. In other words, when a convergent luminous flux or divergent luminous flux enters the polygon mirror 10 (the same as those of other rotative deflection devices), the light collecting point after reflection becomes almost a circular arc centering on the point of reflection and produces a curvature of the field, assuming that no optical member is provided behind the polygon mirror 10. If a convergent luminous flux enters into the polygon mirror 10, a curvature of the field becomes concave faced to the direction of incidence of light. The distance between the first spherical mirror 20 and an image plane is changed according to the state of convergence of incident light. The curvature of the field is also changed according to the change of the distance between the first spherical mirror 20 and the image plane. In other words, the curvature of the field produced by the concave plane of the first spherical mirror 20 is rectified by the curvature of the field produced by the convergent luminous flux to result in making the curvature of the field at the light collecting surface smaller and the level of the image plane is improved.

In this regard, the toroidal lens 15 is also provided with the same function to lessen the curvature of the field. When the curvature of the field becomes smaller, the variation in the diameter of convergent luminous flux caused by the difference in scanning position (image height) becomes smaller, and an optical system can be utilized in wider angles. Moreover, image can be more densely produced since the diameter of convergent luminous flux can be made smaller.

When the first spherical mirror 20 is tilted, there occurs a curve in the scanning line which will now be described referring to the FIG. 8.

Figure 8:
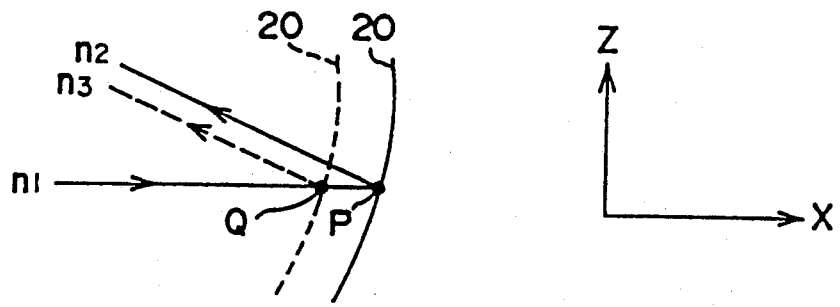
FIG. 8 is a drawing for explaining the curve of a main scanning line by an inclination of a spherical mirror.

The FIG. 8 shows an optical axis in the plane perpendicular to the main scanning direction, and the point P represents a reflecting point of the main light when deflection angle is 0°, while a point Q represents a reflecting point of the main light when the deflection angle is $\theta$. The reflecting point is shifted in the direction of the axis X when the deflection angle 0° is changed to $\theta$ since the first spherical mirror 20 has a curvature (curvature in the deflection plane is important hereat). A reflected light n3 of the deflection angle $\theta$ relative to an incident light n1 is shifted in the direction of the axis Z with respect to a reflected light n2 of the deflection angle 0°. The amount of the shift is varied corresponding to the deflection angle $\theta$, and the reflected lights n2 and n3 are not included in the same plane. Accordingly, the scanning line is also curved in the direction of the axis Z in the plane perpendicular to the optical axis. However, such a curve in the scanning line can be rectified by the second spherical mirror 25. In other words, the curve in the scanning line can be made smaller when the curve on the scanning line produced by the second spherical mirror 25 is conversely utilized.

Figure 2:
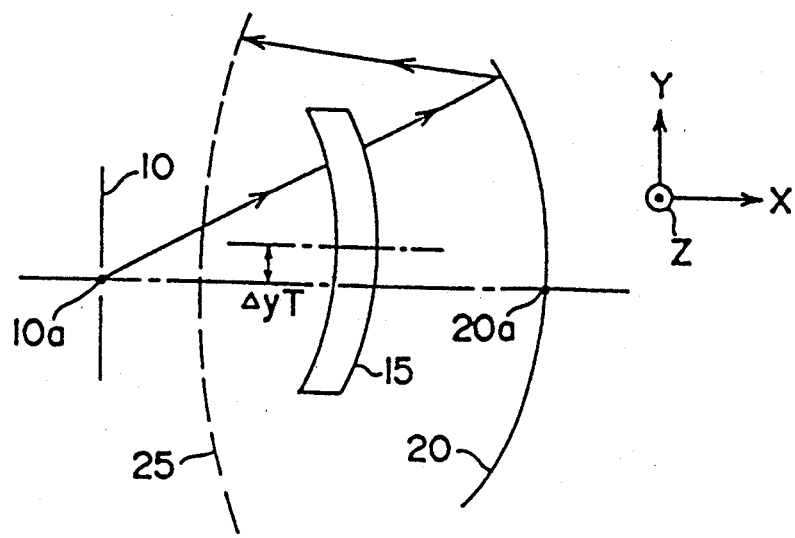
FIGS. 2 and 3 are drawings for typically explaining light paths.
Figure 3:
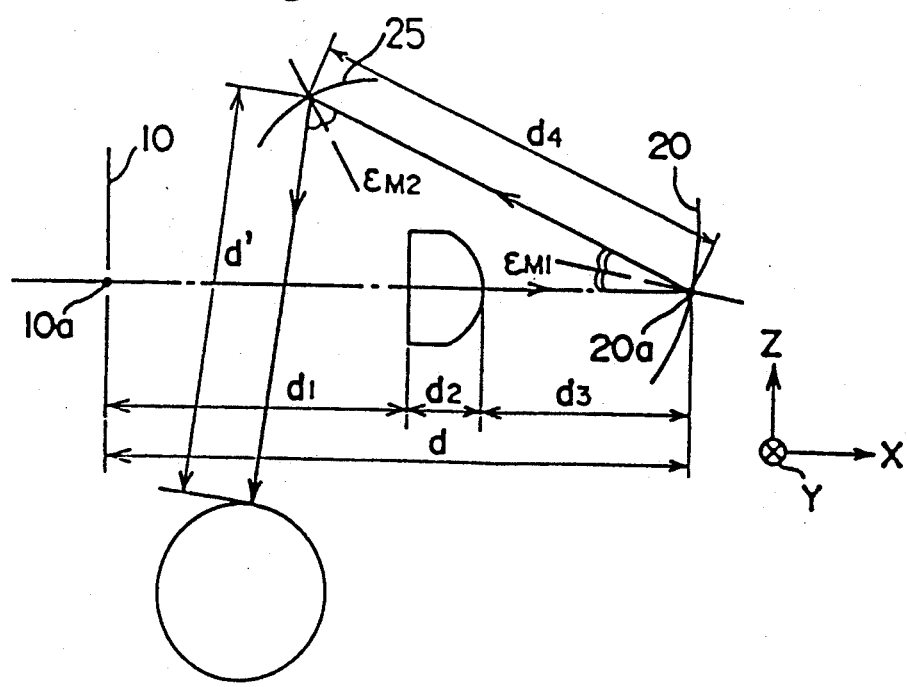
Figure 4C:
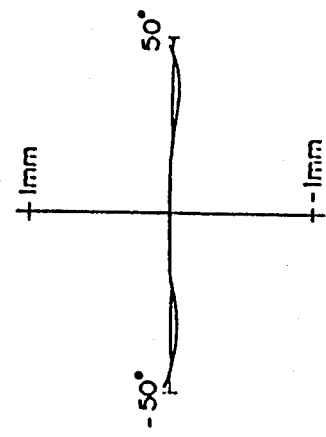
Figure 4B:
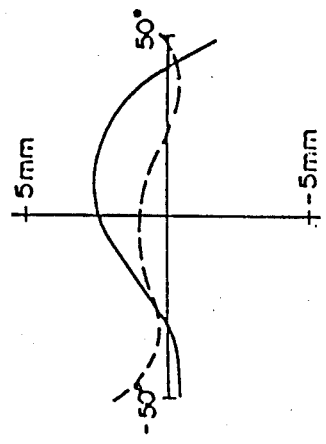
Figure 4A:
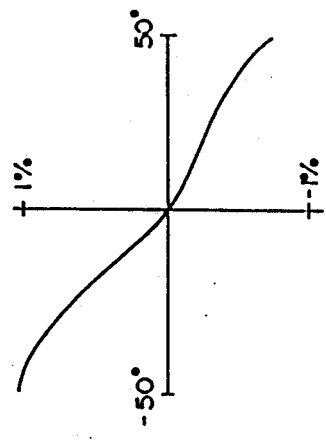
Figure 5C:
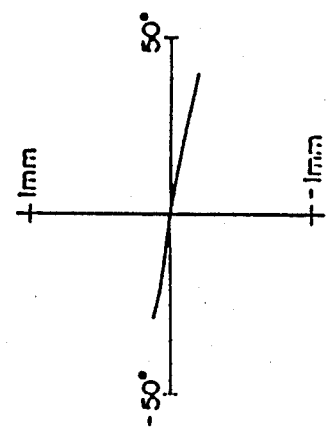
Figure 5B:
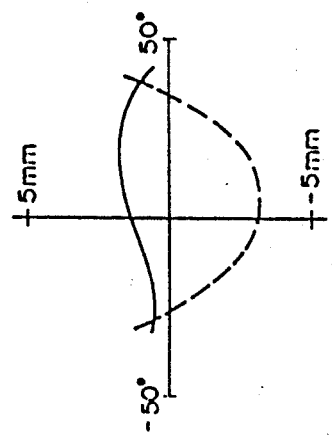
Figure 5A:
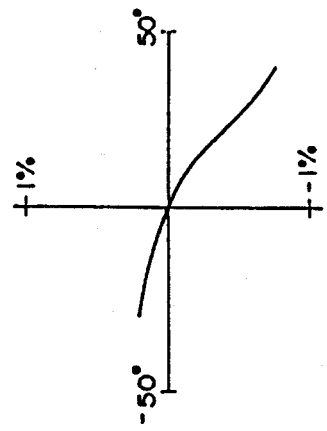

As illustrated in detail in the FIGS. 2 and 3, the relationship between the distance d from the polygon mirror 10 to the first spherical mirror 20, in more detail from a point of deflection 10a of the polygon mirror 10 to the vertex 20a of the first spherical mirror 20, and the radius of curvature $R_M1$ of the first mirror 20, the relationship between the radius of curvature $R_l1$ and the distance $s = d + d4 + d'$ (not shown) from the polygon mirror 10 to a light collecting point, in more detail from the point of deflection 10a to a light collecting point after deflection at the polygon mirror 10 and also the relationship between the radius of curvature $R_M1$ and the radius of curvature $R_M2$ of the second spherical mirror 25 are set to preferably fulfill the following equations.

$$|s/R_M1| > 0.7 \qquad 1$$

$$0.15 > (d/|R_M1|) > 0.7 \qquad 2$$

$$(|R_M2|/|R_M1|) > 7 \qquad 3$$

The second spherical mirror 25 is provided with a function to fold back the luminous flux from the first spherical mirror 20 toward the photoconductor 30. The second spherical mirror 25 is therefore disposed by tilting it more than 30 degrees relative to an incident luminous flux.

When the above equations (1), (2) and (3) are fulfilled, satisfactory distortion characteristics as well as a satisfactory level of image plane can be obtained over the wide range of angles. The minimum and maximum values in each one of the above equations are set within the experientially permissible range of image distortion on the photoconductor 30.

If the value goes below the minimum limit in the equation (1), the image plane approaches the spherical mirror 20 and it makes it difficult to dispose the mirror 20, and the distortion characteristics become worse.

On the other hand, if the value goes below the minimum limit in the equation (2), positive distortion is increased according to the increment of angle of deflection to result in the elongation of image at both edges in the main scanning direction (in the vicinity of scan starting and scan ending positions). If the value exceeds the maximum limit of equation (2), negative distortion is increased according to the increment of angle of deflection to result in the shrinkage of image at both edges in the main scanning direction and the curvature of the field further becomes large or the distortion characteristics becomes worse. If the value exceeds the maximum limit in the equation (3), the distortion characteristics become worse.

The constructional data in the experimental examples I, II, III and IV in this embodiment will be shown in the following Tables 1 and 2, wherein the diameter of an inscribed circle of the polygon mirror 10 is set at 23.5 mm.

TABLE 1

| | EXPERIMENTAL EXAMPLE | | | |
|---|---|---|---|---|
| | I | II | III | IV |
| Distance from Point of Deflection to Light Collecting Point after reflection at Polygon Mirror (s)mm | 180 | 185 | 900 | 500 |
| Distance from Point of Deflection to Spherical Mirror (d)mm | 55 | 80 | 120 | 35 |
| Distance from deflection plane to the front of Toroidal Lens ($d_1$)mm | 25 | 25 | 25 | 15 |
| Thickness of Toroidal Lens ($d_2$)mm | 5 | 5 | 5 | 5 |
| Distance from the back of Toroidal Lens to First Spherical Mirror ($d_3$)mm | 25 | 50 | 90 | 15 |
| Distance from First Spherical Mirror to Second Spherical Mirror ($d_4$)mm | 38 | 28 | 40 | 40 |
| Distance from Second Spherical Mirror to Light Collecting Point (d')mm | 20 | 30 | 60 | 58 |
| Radius of Curvature of Toroidal Lens on deflection plane on the side of incidence ($R_{1a}$)mm | −38 | −38 | −40 | −24 |
| Radius of Curvature of Toroidal Lens on deflection plane on the side of projection ($R_{2a}$)mm | −43 | −43 | −45 | −29 |
| Radius of Curvature of Toroidal Lens on surface perpendicular to deflection plane on the side of incidence ($R_1b$)mm | ∞ | ∞ | ∞ | ∞ |
| Radius of Curvature of Toroidal Lens on surface perpendicular to deflection plane on the side of projection ($R_2b$)mm | −13 | −13 | −15 | −9.7 |

TABLE 2

| | EXPERIMENTAL EXAMPLE | | | |
|---|---|---|---|---|
| | I | II | III | IV |
| Refractive Index of Toroidal Lens | 1.51117 | 1.51117 | 1.51117 | 1.51117 |
| Amount of Shift of Toroidal Lens (ΔyT) | 1.5 | 1.5 | 1.0 | 1.0 |
| Radius of Curvature of First Spherical Mirror ($R_{M1}$)mm | −200 | −200 | −200 | −200 |
| Radius of Curvature of Second Spherical Mirror ($R_{M2}$)mm | −1400 | −1650 | −2500 | −1500 |
| Inclination of First Spherical Mirror ($R_{M1}$)mm | 5.7° | 4° | 2° | 7° |
| Inclination of Second Spherical Mirror ($R_{M2}$)mm | 50° | 45° | 45° | 40° |
| $s/|R_{M1}|$ | 0.90 | 0.925 | 4.5 | 2.5 |
| $d/|R_{M1}|$ | 0.275 | 0.40 | 0.60 | 0.175 |
| $|R_{M2}|/|R_{M1}|$ | 7 | 8.25 | 12.5 | 7.5 |

The aberrations at the light collecting surface on the photoconductor in each one of the above experimental examples I, II, III and IV are shown in the FIGS. 4 through 7. In the figures (a), scanning angle is shown by horizontal axis and degree of distortion by vertical axis. In the figures (b), scanning angle is shown by horizontal axis and degree of curvature by vertical axis. A dotted line shows curvature of the field by a luminous flux in the deflection plane and a solid line shows curvature of the field by a luminous flux in the vertical plane relative to the deflection plane. In the figures (c), the scanning angle is shown by horizontal axis and the degree of distortion on the scanning line is shown by vertical axis in order to show positional shift of the scanning line, that is, a curve on the scanning line, in the direction perpendicular to the deflection plane.

Figure 9:
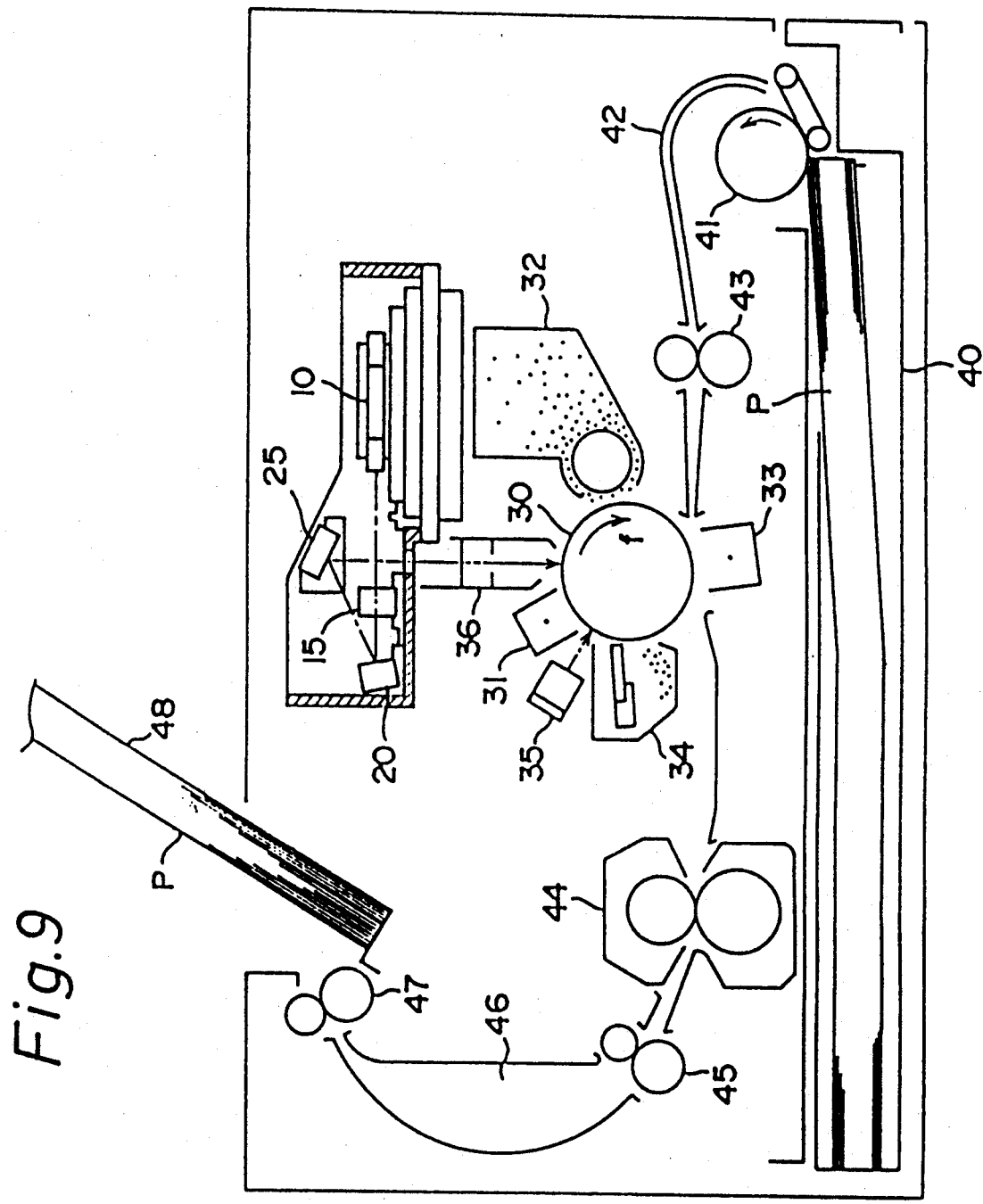
FIG. 9 is a schematic constructional view of a printer which is provided with the optical system of the FIG. 1.

The FIG. 9 shows an example of a printer which is provided with the light beam scanning optical system described above.

Substantially at the central portion of the main body of the printer, a photoconductive drum 30 is rotatably disposed in the direction of arrow f, and around the photoconductor, there are provided a charger 31, a magnetic type developing unit 32, a transfer charger 33, a blade type cleaning device 34 for cleaning the remaining toner and an eraser lamp 35 for erasing the remaining charge. The fundamental construction of the optical system is illustrated in the FIG. 1, and the same reference numerals are used. A luminous flux is radiated from optical path members 36 onto the photoconductive drum 30 which is disposed just behind the charger 31. Description on the operation of image forming apparatus and image forming procedures is omitted since it is known well.

Sheets of paper P are accommodated in an automatic paper feed cassette 40 which is removably disposed at the lower portion of the main body of the printer. A sheet of paper placed uppermost in the cassette is sent out one by one with the rotation of a paper feed roller 41 and is reversed at a path 42. The paper is then forwarded to the position between the photoconductive drum 30 and the transfer charger 33 at a predetermined timing by a pair of timing rollers 43, and a toner image is transferred thereon. Thereafter, fixing procedure is conducted on the paper P by a fixing unit 44, and the paper is finally discharged onto a tray 48 disposed on the upper portion of the main body of the printer through a pair of transport rollers 45, transport path 46 and a pair of discharge rollers 47.

The light beam scanning optical system related to the present invention is not limited to the embodiment described above, and various changes and modifications within the scope of the principles may be employed.

For instance, the polygon mirror 10 utilized in the embodiment as a deflection device may be replaced with various other means if it is capable of scanning a luminous flux at an equiangular velocity on a plane. Besides the semiconductor laser, other laser emitting means or a spot light source may be utilized as a light source.

In the embodiment described above, the shifting of the spherical mirrors 20, 25 in the main scanning direction (the direction of axis Y shown in the FIGS. 2 and 3) is not referred to. However, in consideration of easiness in aberration correction and their positioning, they can be shifted in the main scanning direction. For instance, when the distortional aberrations are not symmetrical, the distortional aberrations can be further reduced by shifting the spherical mirrors 20, 25.

In the embodiment, an emitting luminous flux radiated from a semiconductor laser is rectified to a convergent luminous flux by a collimator lens, however, it may be arranged to simply rectify the emitting luminous flux to a parallel luminous flux.

In conclusion, according to the embodiment, two pieces of spherical mirrors and a toroidal lens are provided in the optical path which is extending from a deflecting means to the surface of photoconductor so as to fulfill the equations 1, 2 and 3 so that the scanning speed in the main scanning direction can be uniformly rectified and a tilt error of each reflective facet of the deflection device can also be rectified. Moreover, irregular pitch on an image in the sub-scanning direction is rectified, and satisfactory distortion characteristics and a satisfactorily leveled image can be obtained over a wide angle of field on the light collecting surface.

Further, the spherical mirror can be easily manufactured compared with the conventional fθ lens, and the accuracy in the manufacturing process is improved. The material can be selected widely since it need not be permeable. An inexpensive and high efficiency scanning optical system can thus be obtained.

Furthermore, an optical path is folded back by the spherical mirror itself to make the whole optical system compact. Compared with the parabolic mirror and elliptical mirror, it can be advantageously manufactured and accuracy in the manufacturing process can be accomplished. It can also be manufactured in small size compared with the conventional concave reflector.

When two sheets of spherical mirrors are tilted in the plane perpendicular to the deflection plane, light can be collected onto the photoconductor without the necessity of arranging a semi-transparent means. Optical members can be disposed more freely and attenuation of light amount is reduced.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A light beam scanning optical system comprising:
light source means for emitting a light beam;
converging means for converging the light beam emitted from said light source means into a straight line in a direction parallel to a beam scanning direction;
a deflection device, disposed in the vicinity where the light beam is converged into said straight line, is provided for deflecting the light beam at an equiangular velocity;
a first spherical mirror which receives and reflects the light beam deflected from said deflection device;
a second spherical mirror which receives and reflects the light beam reflected from said first spherical mirror toward a beam receiving plane; and
a toroidal lens is disposed in an optical axis between the deflection device and the first spherical mirror.

2. A light beam scanning optical system as claimed in claim 1, wherein said first spherical mirror is inclined relative to an axis parallel to the beam scanning direction.

3. A light beam scanning optical system as claimed in claim 1, wherein said second spherical mirror is inclined relative to an axis parallel to the beam scanning direction.

4. A light beam scanning optical system comprising:
light source means for emitting a light beam;
converging means for converging the light beam emitted from said light source means into a straight line in a direction parallel to a beam scanning direction;
a deflection device, disposed in the vicinity where the light beam is converged into said straight line, is provided for deflecting the light beam at an equiangular velocity;
a first spherical mirror which receives and reflects the light beam deflected from said deflection device;
a second spherical mirror which receives and reflects the light beam reflected from said first spherical mirror toward a beam receiving plane; and
a toroidal lens is disposed in an optical axis between the deflection device and the first spherical mirror,
wherein the system fulfills the following three equations:

$$|s/R_{M1}| > 0.7$$

$$0.15 < (d/|R_{M1}|) < 0.7$$

$$(|R_{M2}|/|R_{M1}|) > 0.7$$

where $R_{M1}$ is a radius of curvature of the first spherical mirror, $R_{M2}$ is a radius of curvature of the second spherical mirror, s is a distance from the deflection device to a light beam collecting point, and d is a distance from the deflection device to the first spherical mirror.

5. A light beam scanning optical system as claimed in claim 4, wherein said first spherical mirror is inclined relative to an axis parallel to the beam scanning direction.

6. A light beam scanning optical system as claimed in claim 4, wherein said second spherical mirror is inclined relative to an axis parallel to the beam scanning direction.

7. A light beam scanning optical system comprising:
light source means for emitting a light beam;
deflection means for deflecting the light beam emitted from said light source means at an equiangular velocity;
a first concave spherical reflective surface which receives and reflects the light beam deflected from said deflection means, the first concave spherical reflective surface being tilted to provide a curve in a scanning line; and a second concave spherical reflective surface which receives and reflects the light beam reflected from said first spherical reflective surface toward a beam receiving plane, the second concave spherical reflecting surface being tilted to rectify the curve in the scanning line.

8. A light beam scanning optical system as claimed in claim 7, wherein said deflection means comprises a polygonal mirror.

9. A light beam scanning optical system as claimed in claim 7, wherein said light source means comprises a semiconductor laser element.

10. A light beam scanning optical system as claimed in claim 7, further comprises:
- a collimator lens and a cylindrical lens both disposed between the light source means and the deflection means in optical alignment therewith; and
- a toroidal lens is disposed in an optical axis between the deflection means and the first concave spherical reflective surface.

11. A light beam scanning optical system comprising:
a light source for emitting a light beam;
a polygonal mirror for deflecting the light beam emitted from said light source at an equiangular velocity to scan a beam receiving area;
a first spherical reflective surface which receives and reflects the light beam deflected from said polygonal mirror; and
a second spherical reflective surface which receives and reflects the light beam reflected from said first spherical reflective surface toward the beam receiving area;
wherein said first and second spherical reflective surfaces rectify a scanning speed to be uniform over a range from a center to both edges of the beam receiving area.

12. A light beam scanning optical system as claimed in claim 11, further comprising:
- a collimator lens and a cylindrical lens both positioned between the light source and the polygonal mirror and in optical alignment therewith; and
- a toroidal lens positioned between the polygonal mirror and the first spherical reflective surface and in optical alignment therewith.

* * * * *